May 21, 1957 — E. KLEIN ET AL — 2,793,000
WEIGHT CONTROLLED APPARATUS
Filed Oct. 24, 1952 — 6 Sheets-Sheet 6

INVENTORS
Enrico Klein
Arthur J. Burke,
BY
ATTORNEYS

United States Patent Office 2,793,000
Patented May 21, 1957

2,793,000

WEIGHT CONTROLLED APPARATUS

Enrico Klein and Arthur J. Burke, Oakland, N. J., assignors to Richardson Scale Company, Clifton, N. J., a corporation of New Jersey Application October 24, 1952, Serial No. 316,704

18 Claims. (Cl. 249—14)

The present invention relates to weight controlled apparatus, and more particularly to such apparatus as applied to the weighing of materials in different desired amounts or proportions.

One of the objects of the invention is to provide a weighing machine or scale which can be set to weigh different predetermined weights of material or materials from control means located remotely from the weighing machine or scale.

Another object is to provide means whereby a weighing machine or scale may be provided with an infinite number of settings to weigh practically an unlimited number of weights of material or materials within its capacity.

Another object of the invention is to provide novel apparatus of this kind whereby different predetermined amounts of materials may be weighed automatically and sequentially, and the weighed materials discharged automatically.

A further object of the invention is to provide means for automatically checking the tare weight of the weighing machine or scale after a cycle of operations has been completed and before commencement of the next cycle.

The present invention provides means whereby the control settings for the weighing machine or scale may be made from a location remote therefrom and the settings transmitted to the weighing machine as a cycle of weighing operations proceeds.

The present invention also enables a plurality of settings of the weighing machine to be made in succession for successive weighings of material or materials, as in the making up of formulae, and provides means controlled in accordance with such settings of the weighing machine to cause it automatically to effect the weighings in sequence, and to discharge the weighings from the weighing machine.

To these and other ends, the invention consists in certain improvements, and combinations and arrangements of parts, all as will be hereinafter more fully described, the features of novelty being pointed out more particularly in the claims at the end of this specification.

In the accompanying drawings.

Similar parts are designated by the same reference characters in the several views.

The present embodiment of the invention is shown applied to a scale of the dial type in which a weigh hopper is suspended from a scale dial which may be of any suitable or well known type containing means for measuring the weight of material in the hopper and a pointer which indicates such weight. It is to be understood, however, that the invention is not limited to the particular embodiment shown in the drawings and hereinafter described in detail, as equivalent constructions are contemplated and are included within the scope of the claims.

*General description*

As shown in the present instance, the apparatus comprises a weigh hopper 20 which is suspended by a yoke 22 from a cross member 24 to which are attached a pair of flexible tapes 26. These tapes are attached to a pair of drums fixed on shafts 28 and 28' from which project a pair of pendulums 30 which swing upwardly as the weight imposed thereon by the weight of material fed into the weigh hopper increases. Another flexible tape 32 passes around a pulley fixed to the shaft 28 and around a pulley freely rotatable idly on the shaft 28' and extends around a pulley 34 fixed to a shaft 40 to which a dial pointer 42 is fixed. The shafts 28, 28' and 40 are suitably mounted rotatably in a dial casing 44 having a dial 46 mounted in the front thereof and around which the pointer 42 is movable in accordance with the weight of material fed into the hopper, the dial 46 having suitable graduations thereon representing different weights. The material may be fed into the weigh hopper by feeding means of the screw conveyor, vibrator or any other suitable type, two conveyors 48 and 50 of the belt type being shown diagrammatically, for example, in the present instance, these feed conveyors each having one of its pulleys 49 and 51 respectively connected to electric motors F–1 and F–2 for driving the respective conveyors in directions to feed the material into the weigh hopper from supply hoppers 53 and 55 or other suitable supply means.

According to the present invention, the motors F–1 and F–2 which drive the feed conveyors are controlled electronically in response to variations in relative position between elements of a capacitor one of which elements is settable according to predetermined weights and the other of which is movable with the dial pointer 42 under the influence of the weight of material fed into the weigh hopper. The capacitor as shown in the present instance comprises a proximity flag 52 which is settable around the dial according to the desired weights of material to be made up in the weigh hopper, and a cooperative proximity flag 54 which is fixed to and rotates with the shaft 40 to which the pointer 42 is fixed and advances around the dial as the weight of material fed into the weigh hopper increases until this flag reaches a position of predetermined area of coverage of the settable flag 52 when the weight of material for which the flag 52 is set has been fed into the weigh hopper.

The present invention provides means for setting the flag 52 in any desired positions around the dial corresponding to the weights of material to be fed into the weigh hopper from a location remote from the weighing machine or scale. The flag 52 is accordingly fixed to but electrically insulated from a shaft 56 which is mounted rotatably in a suitable casing 58 coaxially with the dial shaft 40, and a reversible electric servomotor 60 is connected to the shaft 56 by suitable reduction gearing 62, running of this motor in one or the other direction advancing the flag 52 around the dial from zero or returning this flag to zero. The remote setting means comprises a suitable number of differential transmitting transformers and a receiving or balancing transformer, three of such transmitting transformers TCT, T-1 and T-2 being shown in the present instance, TCT representing a tare check transformer which checks the return of the dial pointer 42 and flag 52 to zero position after completion of one weighing cycle and before commencement of the next weighing cycle, and T-1 and T-2 representing transformers which control the setting of the flag 52 at the different positions around the dial according to the different desired weights of material to be fed into the weigh hopper, and T-3 represents the receiving or balancing transformer. The primaries of the transmitting transformers are series connected to the primary of the receiving or balancing transformer T-3, and the secondaries of the transmitting transformers are connected in series, under control of a switch 70 and through an amplifier 72, to the secondary of the receiving or balancing transformer T-3.

Figure 1:
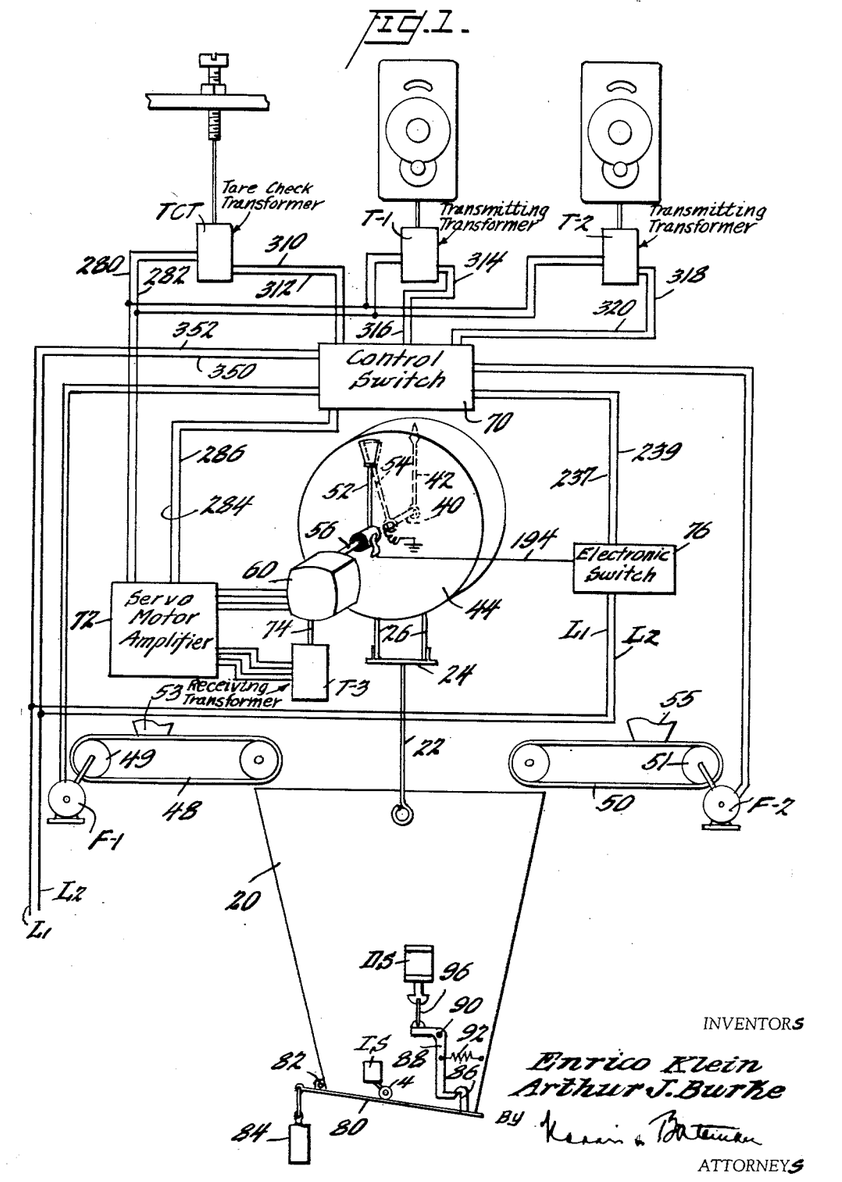
Figure 1 is a diagrammatic view showing the elements of weighing apparatus and control means therefor embodying the present invention.

The amplifier 72 is also connected to the servomotor 60 to supply operating current thereto, annd the core of the receiving or balancing transformer T-3 is operatively connected to the servomotor driven flag shaft 56, as indicated diagrammatically at 74 in Fig. 1, so that the receiving transformer will be brought to electrically balanced relation with the transmitting transformer to which it is connected when the flag 52 reaches a position corresponding to the setting of such transmitting transformer. The operations of the feed conveyors 48 and 50 are controlled from the control switch 70 in response to an electronic switch 76 according to whether the flags 52 and 54 are in the proper predetermined coverage relation to one another, or are relatively displaced around the scale dial.

The weigh hopper is provided with suitable means for discharging the weighed material therefrom, such means as shown in the present instance comprising a hopper door 80 which is hinged at 82 to the lower end of the weigh hopper and is provided with a counterweight 84 which acts to close the door automatically after the discharge of material from the hopper and when the hopper is empty. The door 80 is held in closed position during the feeding and weighing of the material by a catch 86 which is fixed to the door, and a latch 88 which is pivoted to the side of the hopper at 90 and is held yieldingly by a spring 92 in position to latch on the catch 86 when the hopper door is closed by the counterweight after discharge of a weighing from the hopper. The latch is releasable from the catch 86 by a solenoid DS when energized under control of the switch 70, the core of this solenoid being connected by a link 96 to the latch. Energizing of the solenoid DS disengages the latch 88 from the catch 86, thereby releasing the door so that it may swing open under the weight of the material in the hopper and thereby discharge the material from the weigh hopper upon completion of a weighing cycle, and after discharge of the material, the counterweight 84 closes the door and the latch 88 re-engages the catch 86 and holds the hopper door in closed condition for the next weighing.

The weigh hopper is also provided with an interlock switch IS which, as hereinafter explained, prevents initiation of a weighing cycle unless the weigh hopper door is closed and the hopper is in condition to receive material for the next weighing cycle.

Differential transformers

The differential transmitting and receiving transformers employed are preferably of the type having primary windings energized from a suitable source of alternating current, and secondary windings, and cores magnetically coupling the primary and secondary windings and displaceable axially of the windings of the respective transformers.

If the position of the core of the receiving or balancing transformer corresponds with that of the transmitting transformer connected thereto, the voltage in the circuit connecting the secondary windings of such transformers will be equal and the receiving transformer will be balanced with the transmitting transformer to which it is connected, but if such correspondence does not exist, due to relative axial displacement of the cores of the receiving transformer and the transmitting transformer connected thereto, then the voltages in the secondaries of the receiving transformer and the transmitting transformer connected thereto will not be equal, and the receiving transformer will seek balance or an electrical null condition between the secondaries of these transformers. Axial displacement of the core in one or the other direction from a neutral position of the core of a transmitting transformer connected to the receiving transformer will cause a change in the magnitude of the magnetic coupling between the primary and secondary windings of the transmitting transformer and thereby set up a voltage in the secondary windings of the transmitting transformer and of the receiving transformer connected thereto, this voltage being of a magnitude according to the extent of displacement of the core of the transmitting transformer from its neutral position, and also causing a change of phase of the voltage in the secondaries of both of the transformers in one or the opposite sense depending on the direction of displacement of the core of the transmitting transformer.

The servomotor 60 acts in response to such voltage and phase changes in the circuit connecting the secondary windings of the receiving transformer and of the transmitting transformer connected thereto to bring the core of the receiving transformer into correspondence with the displaced core of the transmitting transformer, and to advance the proximity flag 52 from zero to a position corresponding to the setting of the respective transmitting transformer or from a position corresponding to its setting by the first-mentioned transmitting transformer to a second position in response to the setting of a second transmitting transformer, or to return the flag 52 to its zero position on the scale dial.

The tare check transmitting transformer TCT comprises a primary winding 100 and secondary windings 102, and a core or armature 104 movable axially within these windings. As this transmitting transformer is employed for checking the tare condition of the weighing machine after completion of one cycle of operations and before commencement of the next cycle and therefore does not require frequent setting, its core may be adjustable axially of its windings by a screw 106 which may be threaded in a relatively fixed support 107 and connected to the core of this transformer by a rod 108, a lock nut 110 being provided on the screw for locking it in different adjustments.

Figure 9:
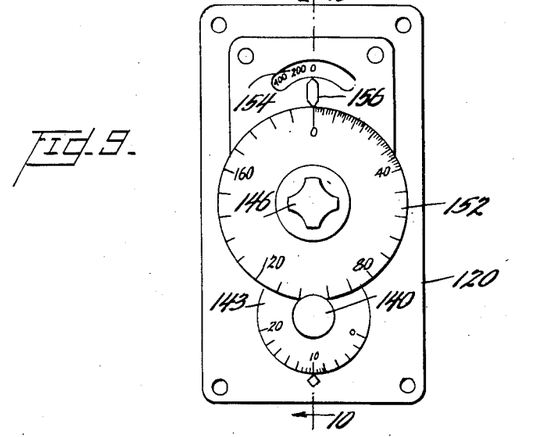
Figure 9 is a front elevation of one of the vernier micrometer setting dials for one of the transmitting differential transformers.
Figure 10:
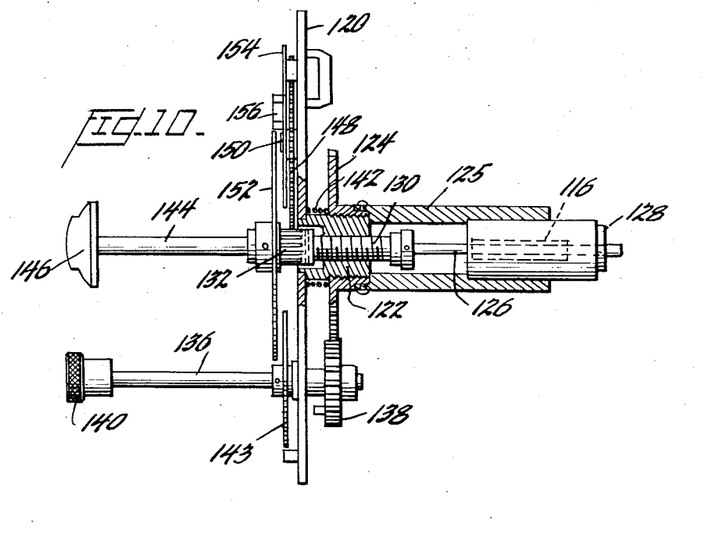
Figure 10 is a vertical section taken on the line 10—10 in Fig. 9, on a larger scale.

Each of the transmitting differential transformers T-1 and T-2 comprises a primary winding 112 or 112A and secondary windings 114 or 114A respectively, and a core or armature 116 or 116A respectively each of which is adjustable axially of the respective transformer windings. As these transformers are set to determine accurately the weights of material to be fed into the weigh hopper, it is preferable to employ a vernier micrometer dial for setting the core of each of these transformers. Each of these setting dials comprises, as shown in Figs. 9 and 10, a plate 120 which may be mounted on a panel at a suitable location remote from the weighing machine, this plate having a hub 122 fixed thereto on which is threaded a gear 124 fixed to a sleeve 125 in which the windings of the respective transformer are mounted and in which the core of the respective transformer is movable axially. The core is mounted on a rod 126 which extends through a guide 128 and is fixed to a micrometer screw 130 which is threaded in the hub 122 and has a pinion 132 fixed thereto, and which rotates with the screw 130, rotation of the screw 130 moving the core axially within the transmitting transformer windings. A shaft 136 is mounted rotatably in the plate 120 and has a pinion 138 fixed thereon to cooperate with the gear 124 for adjusting the sleeve 125 axially on the hub 122, the shaft 136 being rotatable by a knob 140, and the gear 124 and sleeve 125 being held frictionally in different adjusted positions by a spring 142 coiled around the hub 122 between the gear 124 and the plate 120. A dial 143 may be fixed to the shaft 136 and graduated to indicate different settings of the sleeve 125.

The pinion 132 fixed to the screw 130 is connected to a shaft 144 having a knob 146 for rotating it, and this pinion meshes with a gear 148 mounted rotatably on a pivot pin 150 fixed on the plate 120. A dial 152 is fixed to the shaft 144 to rotate therewith, and a dial 154 is fixed to the gear 148 to rotate therewith, a pointer 156 being mounted on the plate 120 to cooperate with these dials. The pinion 132 is smaller than the gear 148, it having a ratio, for example, of 1 to 5, so that several revolutions of the shaft 144 and dial 152 will equal one revolution of the gear 148 and dial 154, and these dials may be graduated accordingly in terms of weight. Such a vernier micrometer dial enables very accurate adjustments of the core of the transmitting transformer to be made axially of the windings thereof. The shaft 136 and its pinion 138 and gear 124 are employed for adjusting the sleeve 125 and the transformer windings therein to compensate for the weight of material falling into the weigh hopper at the moment the feed of material thereto is stopped, it enabling such compensation to be made independently of and without disturbing the setting of the transformer core by the shaft 144 as indicated by the micrometer dial indications.

*Electronic switch*

Figure 5:
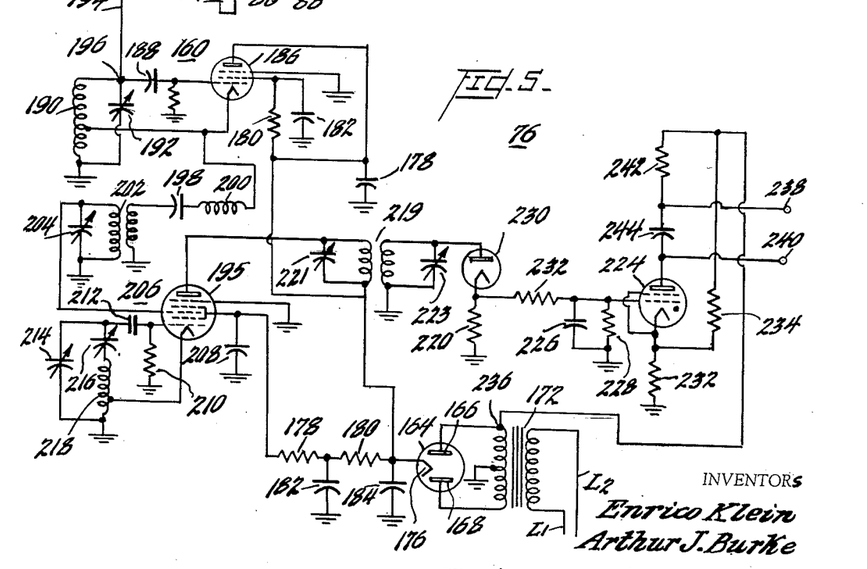
Figure 5 is a diagrammatic view of an electronic switch which is controlled by the setting means associated with the scale dial.

The electronic switch 76, shown in Fig. 5, is preferably similar to that disclosed in prior application Ser. No. 215,576, filed March 14, 1951, now abandoned, to which reference may be had for a detailed description thereof. It is believed to be sufficient for the purposes of the present invention to explain that this switch comprises an oscillator 160 the oscillating frequency of which will be varied by the movement of the flag 54 connected to the weigh hopper relatively to the flag 52 which is settable by one or another of the transmitting transformers, and a circuit tuned to pass a signal to actuate relay ES only when the frequency of oscillation reaches a predetermined value, as when the flag 54 assumes a position in proper predetermined proximity to the flag 52.

The necessary voltages for this circuit may be taken from line terminals $L_1$ and $L_2$ through which alternating current is supplied to the primary of a transformer 172 the secondary of which is connected to a full wave rectifier tube 164 the plates 166 and 168 of which are connected to the output of a grounded center tapped secondary winding of transformer 172. The cathode 176 of rectifier tube 164 is connected through a suitable filter circuit which as shown comprises series resistors 178 and 180 and shunt capacitors 182 and 184 to ground. The anode of pentode tube 186 of oscillating circuit 160 is connected directly to the cathode 176 of rectifier 164 having a shunting capacitor 178 to ground, and the screen grid of pentode 186 is connected thereto through a resistor 180 also having a shunting capacitor 182 to ground. Oscillator 160 is of the conventional Hartley type, the oscillating frequency of which will depend upon the inductance and capacitance of its grid circuit components. The grid of pentode 186 is connected through capacitor 188, and inductor 190 and capacitor 192 in parallel, to ground, the cathode thereof being connected to a tap on inductor 190. Input terminal 194 is connected to the flag 52 and to the grid circuit of tube 186 at point 196 so that the capacitance between flag 52 which is set by the servomotor and the flag 54 which is movable with the weigh hopper is in parallel with capacitor 192 and inductor 190 to ground. The value of capacitor 192 having been preset to a selected value, the frequency of oscillation of oscillator 160 will vary with movement of the weigh hopper. The signal thus generated will be fed to the third grid of pentagrid tube 195 from the cathode of tube 186 through coupling capacitor 198, load coil 200 and transformer 202. A tuning capacitor 204 is connected across the secondary winding of transformer 202.

Pentagrid tube 195 is the tube of a conventional mixer circuit 206 having its second and fourth grids connected to the output of the power supply filter at resistor 178 and having a shunting capacitor 208 to ground. The first grid and the cathode of tube 195 are connected to a conventional oscillator circuit, the first grid having a grid leak resistor 210 and being connected through capacitor 212 and variable capacitor 214 in parallel with capacitor 216 and inductor 218 in series to ground. The cathode of tube 195 is connected to a tap on inductor 218. The frequency of oscillation of this circuit is determined by the values of inductor 218 and variable capacitors 214 and 216.

The anode of tube 195 is connected through the primary winding of transformer 219 to the power supply at cathode 176 of the rectifier tube 164. Tuning capacitors 221 and 223 are connected across the primary and secondary windings respectively of transformer 219. The ungrounded end of the secondary winding of transformer 219 is connected to the anode of rectifier tube 230, and the cathode of this tube is connected to ground through resistor 220.

The signal developed across resistor 220 is fed through resistor 222 to the grid of thyratron tube 224. Capacitor 226 and resistor 228 are connected in parallel from this grid to ground. Thyratron 224 is biased to cut off in the absence of a signal on the grid from rectifier 230 by the voltage developed across cathode resistor 232 and resistor 234 connected in series from ground to the terminal 236 at one end of the secondary winding of the power supply transformer 172. The anode of thyratron 224 is connected through terminals 238 and 240 to the terminals of the coil of relay ES, and through resistor 242 to the terminal 236 at the end of the secondary winding of transformer 172. A capacitor 244 is connected in parallel with the coil of relay ES in the anode circuit of thyratron 224.

The oscillator 160 is adjusted to generate a suitable pre-selected frequency while the weigh hopper is empty and in tare balanced condition and with predetermined extents of the areas of the flags 52 and 54 opposite to or covering one another, by adjusting the capacitor 192 to a pre-selected frequency, preferably between 600 and 1600 kilocycles per second, as for example, 1200 kilocycles per second. The capacitor 204 is then also adjusted so that the secondary winding of transformer 202 is turned to the pre-selected frequency generated by the oscillator 160, and the variable capacitors 214 and 216 will be correspondingly adjusted by "tracking," so that the cathode oscillator grid circuit of tube 195 is tuned, for example, to 744 kilocycles to develop a 456 kilocycles per second beat frequency between the input signal from the oscillator 160 and the oscillations developed in the mixer circuit 206. Intermediate frequency transformer 219 is then tuned sharply by capacitors 221 and 223 to be highly resonant at the assumed intermediate frequency of 456 kilocycles per second to inject maximum energy into rectifier tube 230. With the circuit thus sharply tuned, so long as the frequency of oscillator 160 remains at the pre-selected frequency of 1200 kilocycles per second, the maximum amount of energy will be fed through transformer 202 and by the mixer circuit 206 to the anode of rectifier 230 to develop a direct current voltage across resistor 220 to lower or overcome the bias on thyratron 224. Thyratron will therefore fire and extinguish once each half cycle of the input voltage from source 174 and energize and hold relay ES energized.

With the electronic switch thus adjusted, while the flag 54 is not in such proximity to the flag 52 that the predetermined extent of its area covers the flag 52, the capacitance of the oscillating circuit 160 will be varied, and the oscillator 160 will not oscillate at the pre-selected frequency, and consequently, the frequency of the signal introduced by tube 195 of the circuit 206 to tuned transformer 219 will not be in resonance with the tuning thereof, and therefore there will be a decrement in the signal energy fed into the rectifier 230 due to diminished power transfer into the control grid of the tube 195, and a frequency drift of the input signal in the sharply tuned intermediate frequency circuit of transformer 219. The bias will thus remain on thyratron 224 causing it to block and thus release relay ES.

The relay ES (Fig. 2) has pairs of contacts 1, 2 and 3 which are normally open but are closed when this relay is energized, and pairs of contacts 4 and 5 which are normally closed but are opened when this relay is energized.

*Servomotor amplifier*

Figure 3:
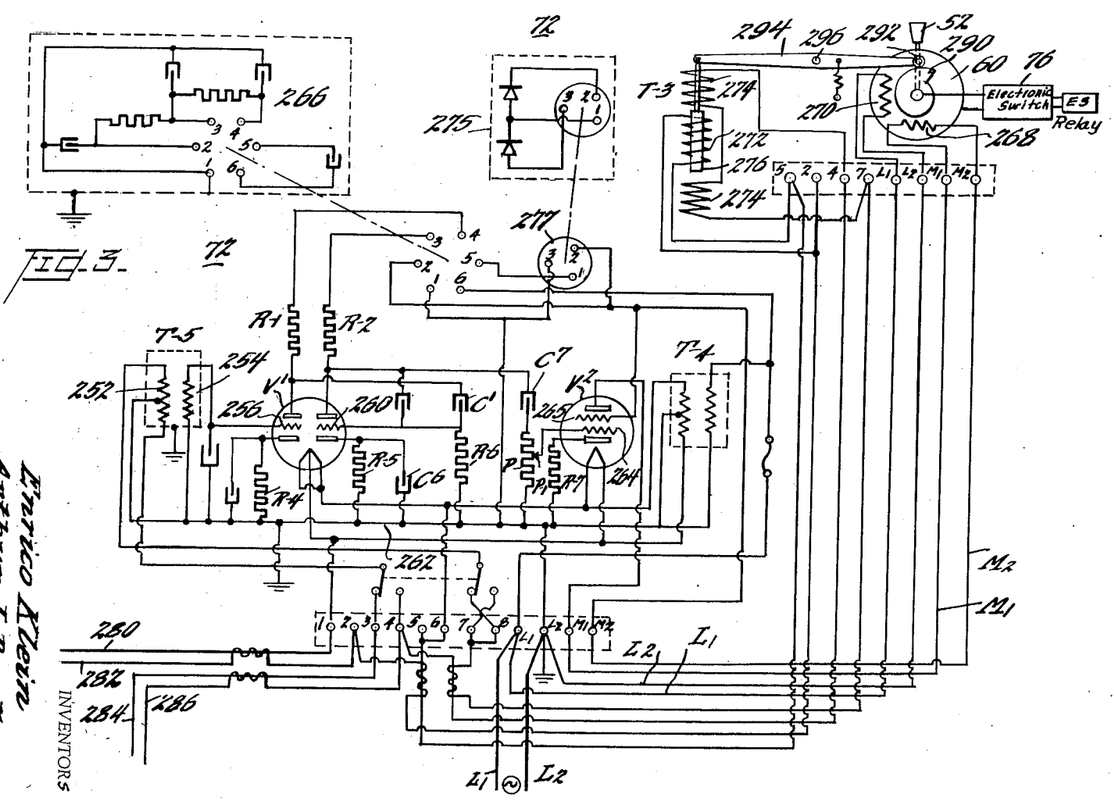
Figure 3 is a diagrammatic view of an amplifier for the differential transformers employed according to the invention, and the servomotor controlled thereby for setting the weighing machine for different weighing operations.
Figure 4:
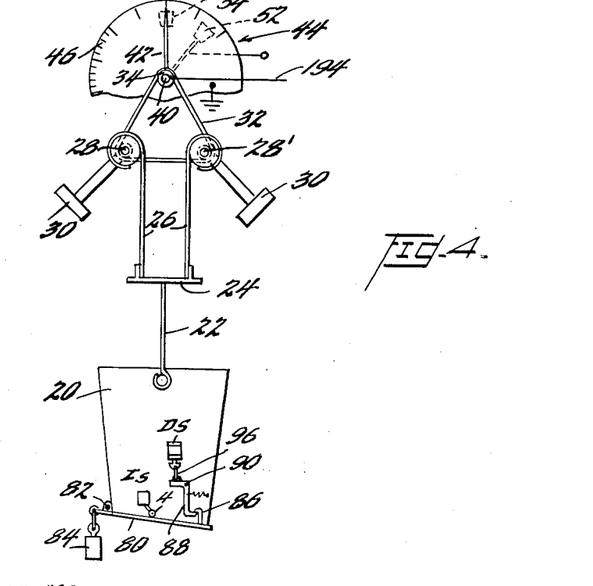
Figure 4 is a detail view of the scale dial, and the means associated therewith for setting the weighing machine for the different weighing operations.

The amplifier 72 may be of any suitable electronic type responsive to a phase shifted voltage resulting from the combined output of one of the core-displaced differential transmitting transformers connected in series with the differential receiving or balancing transformer T-3, for supplying amplified energy to the servomotor 60 to cause it to run in one or the other direction to advance the flag 52 or to return it to zero on the scale dial. The amplifier shown in Fig. 3 is of a known form which has been found to be suitable for the purpose, it comprising an input transformer T-5 to the primary 252 of which the phase shifted voltage is applied from terminals 3 and 7. The output of the secondary 254 of this transformer is applied to the grid 256 of the first half of double triode amplifier tube $V^1$ and to ground, this half of this tube being biased by cathode resistor R-4. The output signal of the first half of tube $V^1$, in the form of plate current intensity variations, is transferred to the grid 260 of the second half of the tube $V^1$ through a coupling condenser $C^1$. The signal voltage is developed between the grid 260 and ground conductor 262 through load resistor R-6. The second half of tube $V^1$ is biased by cathode resistor R-5 by-passed by condenser $C^6$. R-1 and R-2 are plate load resistors.

The output signal from the plate of the second half of tube $V^1$ is coupled to the control grid 264 of the power tube $V^2$ through coupling condenser $C^7$, and the amplitude of the signal transfer is controlled by gain potentiometer P. The desired strength of signal is obtained by the setting of the center arm $P^1$ of the potentiometer, and the signal is applied to the control grid 264 of the tube $V^2$. The cathode bias for tube $V^2$ is developed across cathode resistor R-7, and the screen grid 265 of this tube receives the necessary positive potential through prong 2 of a filter-voltage divider plug-in unit 266.

The output voltage of tube $V^2$ is applied through terminals $M_1$ and $M_2$ to the control winding 268 of the servomotor 60 which is of the two phase type, and line voltage from terminals $L_1$ and $L_2$ is applied to the control winding 270 of the servomotor. The servomotor is of the type in which reversibility of induction is produced by energizing of the control winding 268 or 270 so that the servomotor will run clockwise when the energy in the winding 270 connected between the lines $L_1$ and $L_2$ prevails, the pulsating output of the tube $V^2$ being weaker than that of the line current, and will run counterclockwise when the energy in the winding 268 connected to the terminals $M^1$ and $M^2$ prevails; and the servomotor will remain at a standstill when the energies in the two windings 268 and 270 balance.

The receiving or balancing transformer T-3 has a primary winding 272 and secondary windings 274 alined axially therewith, the primary winding being connected to terminals 2 and 5 which are connected to the correspondingly numbered terminals of the amplifier, and the secondary windings being connected to the terminals 4 and 7. The receiving or balancing transformer T-3 has a core or armature 276 which magnetically couples the primary and secondary windings 272 and 274 and is movable axially within these windings. Displacement of the core 276 of this transformer in the appropriate direction by the servo motor, through its connection 74 therewith, causes the voltage input to the transformer T-5 to be restored to zero, since the secondary output of the receiving transformer T-3 is connected in series and in opposition of phase with the secondary of whichever differential transformer, TCT, T-1 or T-2, is switched into the circuit at the moment through the cycling control of the control switch 70, as hereinafter explained. Thus, as voltage input to transformer T-5 is cancelled, the system will remain at rest until the core or armature of one of the transmitting transformers is displaced, or another transmitting transformer having its core or armature in a different position is switched in. The power supply to the amplifier may consist of a conventional rectifier-voltage doubler unit 275 adapted to be plugged into a socket 277.

The primary windings 100, 112 and 112A of the transmitting differential transformers are connected by conductors 280 and 282 to the terminals 1 and 2 of this amplifier, and the secondary windings of the transmitting transformers are connected sequentially by control switch 70 and through the conductors 284 and 286 to the terminals 3 and 4 of this amplifier and to terminal 4 of the receiving transformer and from terminal 7 thereof to terminal 7 of this amplifier. The phase shifted voltage resulting from the combined output of the receiving transformer and one or another of the transmitting differential transformers connected thereto is applied to this amplifier. The pairs of terminals 5 and 6, and 7 and 8 of this amplifier are coupled and are connected respectively to the terminals 5 and 7 of the receiving transformer T-3, and the line terminals $L_1$ and $L_2$ of this amplifier are connected to the primary of the power transformer T-4 whereby the primary windings of the transmitting and receiving transformers are energized, the line terminals $L_1$ and $L_2$ being connected to the correspondingly designated terminals of the servomotor 60.

Figures 6, 8:
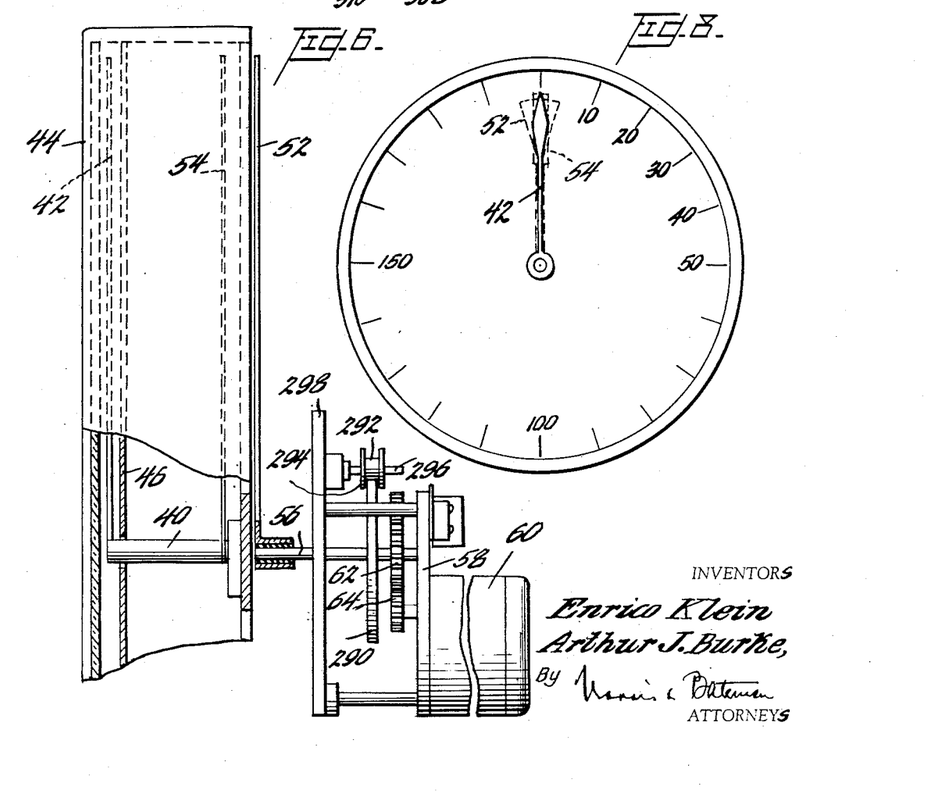
Figure 6 is an enlarged elevation, partly in section, of a portion of the scale dial and associated elements.
Figure 8 is a front elevation of the scale dial equipped with setting means for controlling the operation of the weighing machine.
Figure 7:
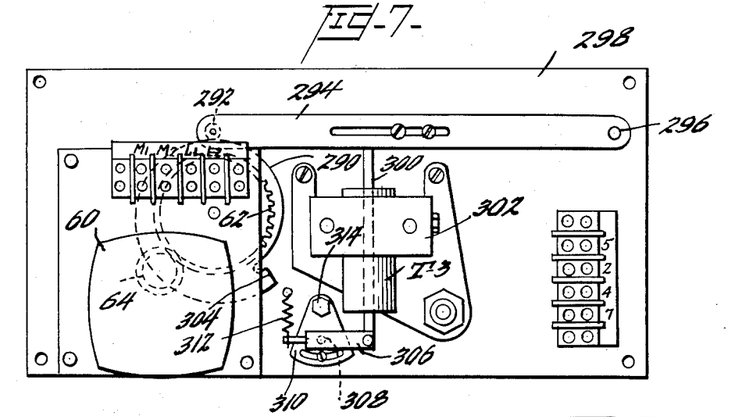
Figure 7 is an elevation of the servomotor and the receiving or balancing transformer associated therewith.

The operative connection between the servomotor 60 and the core of the balancing transformer T-3, indicated diagrammatically at 74 in Fig. 1, is shown in detail in Figs. 6 and 7. As shown in these figures, the shaft 56 driven by the servomotor 60 has a cam 290 fixed thereon to rotate therewith, and a roller 292 on a lever 294 rides on this cam. The lever 294 is pivoted at 296 on a suitable supporting plate 298 and is connected to a rod 300 which is connected to the core or armature 276 of the transformer T-3, which is secured in fixed position on the plate 298 by a suitable bracket 302. The cam 290 is of volute form, so that it will raise or lower the core or armature of the receiving transformer T-3 when the shaft 56 and the flag 52 connected thereto rotate in one or the other direction, and a shoulder 304 is formed at the end of the lower portion of the cam to abut against the roller 292 and thereby arrest rotation of the shaft 56 and flag 52 to prevent uncontrolled rotation and damage to transformer T-3 in the case of an open circuit or permanent unbalance of the system. In order to hold the roller 292 in contact with the cam 290, the lower end of the rod 300 connected to the core or armature of the transformer T-3 may be connected at one end to a lever 306 which is pivoted at a point between its ends, as at 308, to a quadrant 310, and a tension spring 312 is connected to the other end of the lever 306 and acts thereon to exert a downward pull on the rod 300 and lever 294. The quadrant 310 may be pivoted at 314 to the plate 298 for adjustment of the transformer core or armature transversely within the windings of this transformer to ensure linear voltage output with respect to core displacement. The terminals designated 5, 2, 4 and 7, and $M_1$, $M_2$, $L_1$ and $L_2$ in Fig. 7 are connected to and correspond with the similarly designated terminals of the servomotor terminals in Fig. 3.

*Control switch*

Figure 2:
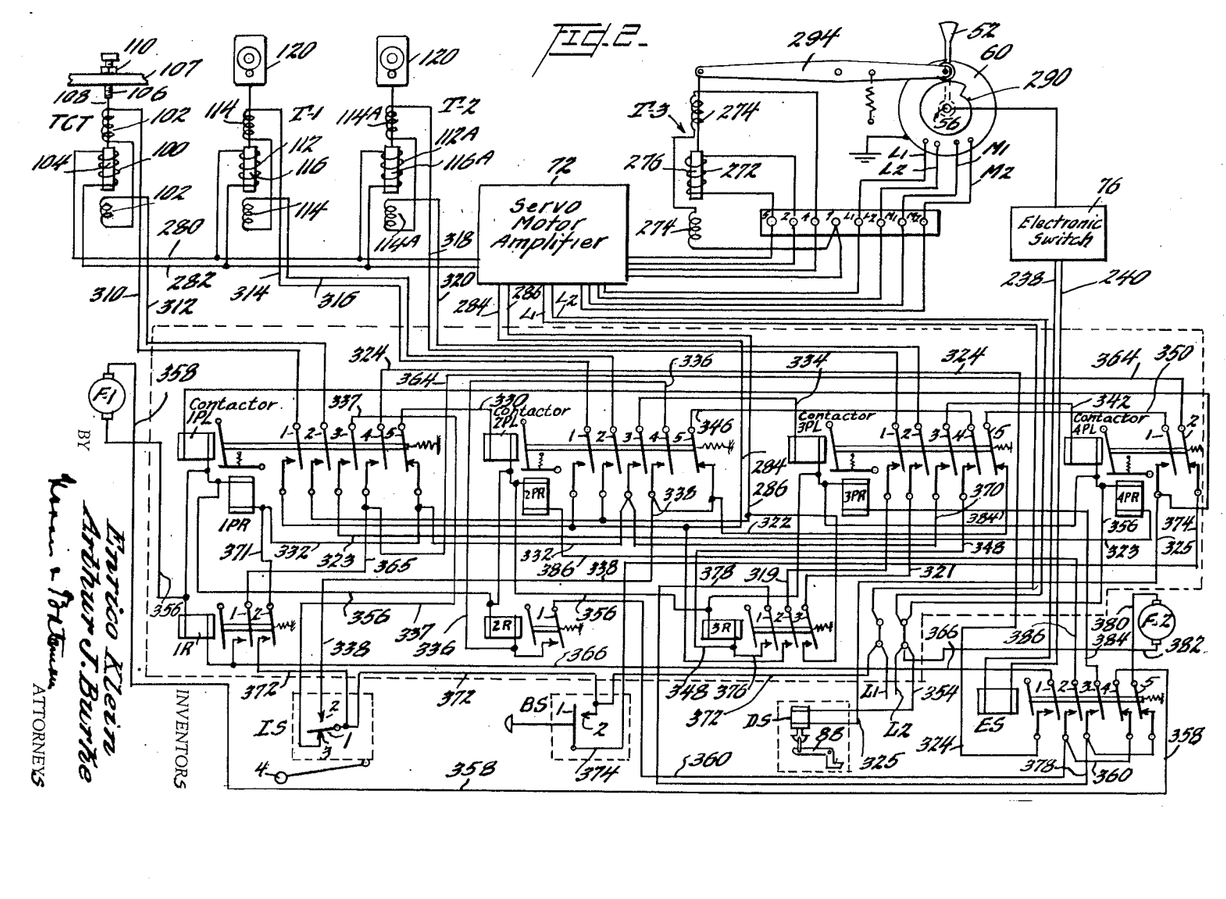
Figure 2 is a diagrammatic view of a control switch and circuits employed according to the invention.

This switch, indicated diagrammatically at 70 in Fig. 1, is shown in detail in Fig. 2. It comprises basically a set of three latch contactors 2PL–2PR, 3PL–3PR and 4PL–4PR which control the sequencing of the feeds of material to and the discharge thereof from the weigh hopper, and a latch contactor 1PL–1PR which controls the resetting of the system upon completion of a cycle. Each of these contactors comprises an electro-magnet and pairs of engageable contacts operative thereby and which for convenience are designated by numerals reading in order from the electro-magnet or from left to right in Fig. 2, some of the pairs of contacts of each contactor being normally open but are closed when its respective magnet is energized, and others being normally closed but are opened when the respective magnet is energized. Each of these contactors has a latch which retains it in energized position after its magnet is de-energized, and which is released by energizing of its respective releasing coil 1PR, 2PR, 3PR or 4PR.

Each of contactors 1PL, 2PL and 3PL has four pairs of normally open contacts designated 1, 2, 3 and 4, and a single pair of normally closed contacts 5, and contactor 4PL has a single pair of normally open contacts designated 1, and a single pair of normally closed contacts designated 2.

The control switch also comprises three relays 1R, 2R and 3R each of which has an electro-magnet and pairs of contacts which are normally open but are closed when the respective electro-magnets are energized, relay 1R having two pairs of contacts designated respectively 1 and 2, relay 2R having a single pair of contacts designated 1, and relay 3R having three pairs of contacts designated respectively 1, 2 and 3.

In Fig. 2, IS represents a hopper door interlock switch having a movable contact 1 and opposed contacts 2 and 3, the contact 1 having a roller 4 connected thereto which is engageable by the hopper door 80 and is operative thereby to close contacts 1 and 2 of switch IS when the hopper door is closed, and to allow the contact 1 to disengage from the contact 2 and to engage the contact 3 when the hopper door is open. BS represents a push-button switch for starting the cycle of operations, it having a switch contact 1 and a cooperative contact 2, and DS represents the hopper door discharge solenoid for tripping the hopper door retaining latch 88. F–1 and F–2 represent the first and second feeder motors.

The secondary windings 102 of transmitting transformer TCT are connected by conductors 310 and 312 to the upper contacts of the pairs 1 and 2 respectively of contactor 1PL, the secondary windings 114 of transmitting transformer T–1 are connected by conductors 314 and 316 to the upper contacts respectively of the pairs 1 and 2 of contactor 2PL, and the secondary windings 114A of transmitting transformer T–2 are connected by conductors 318 and 320 to the upper contacts respectively of the pairs 1 and 2 of contactor 3PL. The lower contacts of the pairs 1 and 2 of contactors 1PL and 2PL are connected respectively to conductors 284 and 286 leading to the amplifier. The lower contact of the pair 1 of contactor 3PL is connected by conductor 319 to the upper contact of the pair 2 of relay 3R, and the lower contact of the pair 2 of this contactor is connected by conductor 321 to the upper contact of the pair 3 of relay 3R, the lower contacts of the pairs 2 and 3 of relay 3R being connected respectively to conductors 284 and 286 leading to the amplifier 72.

The upper contact of the pair 3 of contactor 1PL is connected by conductor 337 to contact 3 of interlock switch IS, and the lower contact of this pair is connected by conductor 323 to release coil 4PR of contactor 4PL. The upper contact of the pair 4 of contactor 1PL is connected by conductor 324 to the lower contact of the pair 1 of relay ES, the lower contact of the pair 4 of contactor 1PL is connected by conductor 364 to the upper contact of the pair 2 of contactor 4PL and by conductor 365 to the upper contact of the pair 1 of relay 1R, and the lower contact of the pair 2 of contactor 4PL is connected by conductor 378 to contact 1 of push-button BS. The upper contact of the pair 5 of contactor 1PL is connected by conductor 330 to energizing coil of contactor 2PL and the lower contact of this pair is connected by conductor 332 to release coil 1PR and to the lower contacts of the pairs 3 of contactors 2PL and 3PL.

The upper contact of the pair 3 of contactor 2PL is connected by conductor 334 to the energizing coil of contactor 3PL and the lower contact of this pair is connected to the conductor 332. The upper contact of the pair 4 of contactor 2PL is connected by conductor 336 to the lower terminal of relay coil 2R, and the lower contact of this pair is connected by conductor 338 to contact 2 of interlock switch IS and by conductor 322 to the lower contact of the pair 5 of contactor 3PL. The upper contact of the pair 5 of contactor 2PL is connected by conductor 346 to the upper contact of pair 4 of contactor 3PL and the lower contact of the pair 5 of contactor 2PL is connected by conductor 322 to the lower contact of pair 5 of contractor 3PL and by conductor 322 to the lower contact of pair 5 of contactor 3PL and by conductor 338 to contact 2 of interlock switch IS.

The upper contact of the pair 3 of contactor 3PL is connected by conductor 342 to the energizing coil of contactor 4PL, and the lower contact of this pair is connected by conductor 370 to the conductor 332. The upper contact of the pair 4 of contactor 3PL is connected by conductor 346 to the upper contact of the pair 5 of contactor 2PL, and the lower contact of the pair 4 of contactor 3PL is connected by the conductor 348 to the coil of relay 3R and by conductor 376 to the lower contact of the pair 1 of this relay. The upper contact of the pair 5 of contactor 3PL is connected by conductor 350 to the upper contact of the pair 1 of contactor 4PL and the lower contact of the pair 5 of contactor 3PL is connected to conductor 338.

The lower contact of the pair 1 of contactor 4PL is connected by conductor 325 to one terminal of solenoid DS, the other terminal of this solenoid being connected by conductor 354 to line terminal $L_2$.

The upper terminals of the coils of relays 1R, 2R and 3R are connected to a conductor 356 which leads from line terminal $L_2$, this conductor being also connected to one terminal of the coil of contactor 1PL and to one terminal of its release coil 1PR, to one terminal of the coil of contactor 2PL and to one terminal of its release coil 2PR, to one terminal of the coil of contactor 3PL and to one terminal of its release coil 3PR, and to one terminal of contactor 4PL and to one terminal of its release coil 4PR, and this conductor 356 is also connected to the lower terminal of feeder motor F–1, the other terminal of this motor being connected by conductor 358 to the upper contact of the pair 4 of relay ES, the lower contact of the latter pair being connected by conductor 360 to the upper contact of the pair 1 of relay 2R the lower contact of which is connected by conductor 362 to the lower terminal of relay coil 2R and through the conductor 336 to the upper contact of the pair 4 of contactor 2PL.

The upper contact of the pair 1 of relay 1R is connected by conductor 365 to the lower contact of the pair 4 of contactor 1PL, and the lower contact of the pair 1 of relay 1R is connected by conductor 366 to the lower terminal of the coil of this relay and by conductor 366 to the upper contact of the pair 1 of relay ES the lower contact of which latter pair is connected by conductor 324 to the upper contact of the pair 4 of contactor 1PL. The upper contact of the pair 2 of relay 1R is connected by conductor 371 to the lower terminal of release coil 1PR and to conductor 332, the lower contact of the pair 2 of relay 1R being connected to conductor 372 which is connected to switch contact 1 of interlock switch IS and to push-button contact 2 and to line terminal $L_1$, the other contact 1 of this push-button BS being connected by conductor 374 to the lower contact of the pair 2 of contactor 4PL.

The lower contact of the pair 1 of relay 3R is connected by conductor 376 to the lower terminal of the coil of this relay, and to conductor 348 which is connected to the lower contact of the pair 4 of contactor 3PL, and the upper contact of the pair 1 of relay 3R is connected by conductor 378 to the lower contact of the pair 3 of relay ES which is coupled with the lower contact of the pair 5 of this relay. The upper contact of the pair 2 of relay 3R, as hereinbefore described, is connected by conductor 319 to the lower contact of the pair 1 of contactor 3PL and the lower contact of the pair 2 of relay 3R is connected to conductor 284, and the upper contact of the pair 3 of relay 3R is connected by conductor 321 to the lower contact of the pair 2 of contactor 3PL and the lower contact of the pair 3 of relay 3R is connected to conductor 286.

The upper contact of the pair 1 of relay ES is connected to conductor 366 which is connected to the lower contact of the pair 1 of relay 1R and to the coil of this relay, and the lower contact of the pair 1 of relay ES is connected to conductor 324 which is connected to the upper contact of the pair 4 of contactor 1PL. The upper contact of the pair 2 of relay ES is connected by conductor 386 to the lower terminal of release coil 2PR of contactor 2PL, and the lower contact of the pair 2 of relay ES is connected to conductor 360 which is connected to the upper contact of the pair of relay 2R. The upper contact of the pair 3 of relay ES is connected by conductor 384 to the lower terminal of release coil 3PR of contactor 3PL, and the lower contact of the pair 3 of relay ES is connected to conductor 378. The upper contact of the pair 4 of relay ES is connected to conductor 358 which is connected to the upper terminal of feeder motor F-1, and the lower contact of the pair 4 of relay ES is connected to conductor 360 connected to the upper contact of the pair of relay 2R. The upper contact of the pair 5 of relay ES is connected by conductor 380 to one terminal of feeder motor F-2, the other terminal of this motor being connected by conductor 382 to line terminal $L_2$. The lower terminal of release coil 1PR of contactor 1PL is connected to conductor 332 which is connected to the lower contact of the pair 5 of contactor 1PL and to the lower contacts of pairs 3 of contactors 2PL and 3PL.

Operation

Tare check transformer TCT is set by adjustment of its screw to bring the flag 52 into predetermined proximity to the flag 54 while the latter is at zero and the weigh hopper is empty and in tare balance, and transformers T-1 and T-2 are set by their respective vernier micrometer dials according to the weights of material to be fed successively into the weigh hopper.

Latch contactor 1PL when energized and latched in connects the secondary windings 102 of tare check transformer TCT through conductors 310 and 312 and then closed contacts 1 and 2 of this contactor and conductors 284 and 286 to the servomotor amplifier 72; latch contactor 2PL when energized and latched in connects the secondary windings 114 of transformer T-1 to the servomotor amplifier 72 through conductors 314 and 316, then closed contacts 1 and 2 of this contactor and conductors 284 and 286; and latch contactor 3PL when energized and latched in connects the secondary windings 114A of transformer T-2 to amplifier 72 through conductors 318 and 320, then closed contacts 1 and 2 of this contactor, then closed contacts 2 and 3 of relay 3R, and conductors 284 and 286. The sequential connections of these transformers to the servomotor amplifier energizes the servomotor which, in turn, runs in the appropriate direction and extent under control of electronic switch 76, and displaces the cut-off flag 52 around the periphery of the scale dial to the positions correspondingly respectively to tare check (zero) as prescribed by the setting of transformer TCT, to the first weight to be fed into the weigh hopper as prescribed by the setting of transformer T-1, and to the second weight to be fed into the weigh hopper as prescribed by the setting of transformer T-2.

As the flag 52 is positioned as prescribed by the setting of transformer T-1, the feeder motor F-1 will run until correct balance is reached and the flag 54 assumes a position which presents a predetermined area of its surface opposite or in proximity to the flag 52, whereupon electronic switch 76 will energize relay ES and cut off this feeder motor, and as the flag 52 is placed in a second position as prescribed by the setting of transformer T-2, the feeder motor F-2 will run until flag 54 assumes such a predetermined position opposite or in proximity to the flag 52 in such second position, and the electronic switch 76 will then energize relay ES and cut off this feeder motor at correct balance in accordance with the second setting of the flag 52, and the solenoid DS will then be energized and will release the door of the weigh hopper and discharge the weighed material therefrom.

Assuming, for example, that the system is at the point in the cycle subsequent to discharge of the weigh hopper after completion of a weighing cycle and that the weigh hopper is empty, at which time proximity flag 54 and proximity flag 52 should both be at zero on the scale dial, as shown in Fig. 1, pressing the push-button BS momentarily will close push-button contacts 1 and 2. At this time, latch contactor 4PL is released and its contacts 2 closed, and latch contactor 1PL will be latched in and its contacts 4 closed. Relay ES will be energized by firing of the tube 224 of electronic switch 76 and its contacts 1 closed if the weigh hopper has properly discharged its load and reached correct tare position, under which condition the proximity flags 52 and 54 will be in predetermined proximity. Since contactor 1PL is energized under this condition, the secondary windings 102 of differential transformer TCT are now connected to the servomotor amplifier 72 through conductors 310 and 312, then closed contacts 1 and 2 of contactor 1PL, and conductors 284 and 286, and the amplifier 72 will be in condition for operation of the servomotor 60 to advance the flag 52 around the scale dial and to initiate a weighing cycle. If a correct tare condition does not exist, relay ES will not be energized by electronic switch 76 and its contacts 1 will be open, and it will not be possible to initiate a weighing cycle until the incorrect tare condition has been corrected. An effective tare check interlock is thus provided.

As current reaches the lower coil terminal of relay 1R by conductor 372 from line terminal $L_1$ and through then closed contacts 1 and 2 of push-button BS, conductor 374 and then closed contacts 2 of contactor 4PL, conductor 364, then closed contacts 4 of contactor 1PL, then by conductor 324 and through closed contacts 1 of relay ES, then by conductor 366 and through coil of relay 1R and conductor 356 to line terminal L₂, relay 1R energizes, closing its contacts 1 which close a holding circuit through these contacts and conductors 364 and 366, thereby retaining relay 1R energized until push-button BS is released, as contacts 2 of contactor 4PL and contacts 4 of contactor 1PL will open immediately, as presently described. Energization of relay 1R will also close its contacts 2 connecting conductors 372 and 371, causing release coil 1PR of contactor 1PL to energize through conductors 371 and 356 and release this contactor, thus opening contacts 4 of conactor 1PL. However, as previously mentioned, relay 1R will remain energized until either push-button BS is released, or contacts 2 of contactor 4PL open, whichever occurs first. Actually, when contacts 2 of contactor 4PL open, the function of relay 1R is accomplished, and it may drop out even though the push-button BS is still depressed. This arrangement prevents interference with the starting circuit while the weighing cycle is in progress because contacts 2 of contactor 4PL and contacts 4 of contactor 1PL will now remain open until the weigh hopper has discharged after completing the loading thereof.

As contactor 1PL is released, its contacts 1 and 2 open, disconnecting conductors 310 and 312 of transformer TCT from the amplifier 72 and leaving the flag 52 free floating momentarily. Immediately, however, after the engaging of contacts 5 of contactors 1PL due to the release of this contactor, contactor 2PL will energize and latch in through its coil terminals and conductor 330. This will close contacts 1 and 2 of contactor 2PL, thereby connecting conductors 314 and 316 to the amplifier and giving transmitting transformer T-1 control of the flag 52 according to the setting of this transformer. The servomotor 60 will then run under control of the receiving differential transformer T-3 to advance the flag 52 around the scale dial until this flag reaches a position according to the setting of transformer T-1 for the first weighing. As the flag 52 leaves proximity with the flag 54, at which time the weigh hopper is still empty and the scale pointer 42 is at zero, proximity relay ES drops out under control of the electronic switch 76, opening its contacts 1, 2 and 3 and closing its contacts 4 and 5. Closing of contacts 3 of contactor 2PL will energize contactor 3PL through its coil terminals and conductor 334, and closing of contacts 3 of contactor 3PL will energize contactor 4PL through its coil terminals and conductor 342. Contactors 2PL, 3PL and 4PL will remain latched in until they are released in turn as the cycle proceeds.

The flag 52, because of the closing of contacts 1 and 2 of contactor 2PL, will now be located in position to cut off the feed upon completion of the first load to be fed into the weigh hopper. Interlock switch IS, verifying the condition of the weigh hopper door 80, is tripped at this time by closing of the weigh hopper door so as to close its contacts 1 and 2 and thereby close a circuit through conductors 338 and 372. Contacts 4 of contactor 2PL are now closed and relay 2R energizes through conductor 336 and the then closed contacts 1 and 2 of IS, closing the contacts of relay 2R, and since the electronic switch relay ES is dropped out because the flag 54 is not in predetermined proximity to the flag 52, the feeder motor F-1 starts, through conductor 358 and closed contacts 4 of relay ES, and material is now fed into the weigh hopper. As the flag 54 advances around the scale dial and reaches a position in predetermined proximity to the flag 52, due to the feeding of material to the weigh hopper, relay ES will again energize under control of electronic switch 76, opening its contacts 4 and immediately stopping the feeder motor F-1 by de-energizing the operating circuit for this motor through these contacts and conductor 358, while closing of contacts 2 of relay ES and thereby closing the circuit through conductor 386 and release coil 2PR releases contactor 2PL and opens its contacts 4, thus dropping out relay 2R by de-energizing conductor 336, and opening contacts 1 and 2 of contactor 2PL which now disconnects transformer T—1 from the servomotor amplifier 72 and leaves the flag 52 floating for an instant.

Contacts 5 of contactor 2PL have now just closed, connecting conductors 322 and 346, while contacts 4 of contactor 3PL remain closed, contactor 3PL not having yet been released, the lower one of the contacts 4 of contactor 3PL being energized and energizing the coil of relay 3R through its coil terminals and conductor 348, and relay 3R pulls in. The flag 52 will now come under control of transmitting transformer T-2 and will be placed in position around the scale dial to terminate the feeding of material into the weigh hopper and thus terminate the second weighing operation, as contacts 2 and 3 of relay 3R are now closed, and as contacts 1 and 2 of contactor 3PL are still closed, the full circuit of transformer T-2 to the servo amplifier 72 will be completed through conductors 384 and 386 and conductors 319 and 321 and contacts 2 and 3 of relay 3R. At the same time, since contacts 1 of relay 3R are now closed, the lower one of contacts 3 of relay ES is now energized through conductor 378. However, as the flag 52 was displaced from proximity to the flag 54 at the first weighing position, relay ES became de-energized under control of electronic switch 76 and dropped out, and its contacts 3 are open and its contacts 5 are closed. The full circuit from the lower one of the contacts 5 of contactor 2PL to the upper one of the contacts 5 of relay ES through conductor 380 is thus completed, and the feeder motor F-2 starts to feed material into the weigh hopper for the second weighing while flag 54 was advanced around the scale dial from the position which it occupied upon completion of the first weighing to the position selected by the setting of transformer T-2 for completion of the second weighing, under the action of the switching cycle performed previously on conductors 319 and 321.

When the predetermined weight of material for the second weighing has been fed into the weigh hopper, the flag 54 assumes the predetermined position in proximity to the flag 52 to cause firing of the tube 224 of the electronic switch 76, thereby causing relay ES to be energized and to pull in, opening its contacts 5 and thereby opening the circuit 380 of the feeder motor F-2 which then stops the feeder 50 immediately, and closing its contacts 3 through conductor 384 to releasing coil 3PR and releasing contactor 3PL, thereby opening contacts 4 of this contactor and releasing relay 3R by interrupting the circuit through conductor 348 to its lower coil terminal. The contacts 1 and 2 of contactor 3PL also open, and the contacts 2 and 3 of relay 3R open, thus disconnecting transformer T-2 from the servomotor amplifier 72 and again leaving the proximity flag 52 free floating for an instant. Contactor 4PL, however, has not yet been released since it was pulled in by energizing thereof at its upper coil terminal through conductor 342 when contactor 3PL pulled in as the result of closing of contacts 3 of contactor 2PL and completing a circuit through conductor 334, which latter contactor had pulled in as a result of the dropping out of the contactor 1PL and closing of its contacts 5 and of the circuit through conductor 330 when its release coil 1PR was energized at the beginning of the cycle which had energized relay 1R through its coil terminals and closed its contacts 2. Therefore, as contactor 3PL releases, closing its contacts 5 through still closed contacts 1 of contactor 4PL, the lower of the contacts 1 of contactor 4PL will energize through conductors 322 and 350. This will energize and pull in solenoid DS by completing the circuit through its terminals and conductors 325 and 354, thereby releasing the latch 88 holding closed the door of the weigh hopper, permitting this door to open and discharge the load from the weigh hopper. As the weigh hopper becomes empty, the counterweight 84 will re-close the weigh hopper door, and the door will be latched automatically by engagement of the catch 86 thereon with the latch 88.

Simultaneously with the energization of hopper door discharge solenoid DS, the coil of contactor 1PL will energize through conductor 325, latching in contacts 1 and 2 of contactor 1PL, thus re-connecting the transmitting transformer TCT to the servomotor amplifier 72, and the servomotor will then run in the opposite direction to return the proximity flag 52 to tare check or zero position. Contacts 4 of contactor 1PL will also close, partially conditioning the circuit to the coil of relay 1R for initiating the feeding of the next batch of material.

As the weigh hopper door opens, contact 1 of interlock switch IS will disengage from contact 2 thereof, thereby interrupting the circuit through conductor 322 and contacts 5 of contactor 3PL, and de-energizing solenoid DS, which has performed its function of tripping the retaining latch 88 of the weigh hopper door. The opposite contact 3 of hopper door interlock switch IS will close as the hopper door opens, and through the pair of contacts 3 of contactor 1PL which is now latched in and conductors 337 and 323, will energize the latch release coil 4PR of contactor 4PL, releasing this contactor and closing its contacts 2 and thereby fully conditioning the circuit for starting the feeder motor F–1. As the flag 52 returns to zero position at the conclusion of the discharge of the weighed charge from the weigh hopper, the tube 224 of the electronic switch 76 will fire, energizing the coil of relay ES and pulling it in and again closing its contacts 1, so that the next closure of the contacts 1 and 2 of push-button BS will again energize relay 1R through its coil terminals and conductor 366 to complete the conditioning to initiate a new weighing cycle.

Latch contactors instead of magnetically held relays are preferably used in the control circuit as hereinbefore described, as such latch contactors ensure continuity of operation in the event of power failure or unauthorized opening of the control power circuit during progress of a weighing cycle.

By providing cooperative proximity flags one of which is settable in different desired positions and the other of which is movable in response to the weighing operation of the weighing machine to control its operation, the attendant can set the weighing machine to weigh any desired weight or weights of material or materials from a location distant from the weighing machine, which is particularly advantageous when a number of weighing machines are to be controlled from a common or central point, or when the weighing machines are located in a room under pressure or which contains toxic fumes or dust, or in which radio-active material is exposed, as the attendant will not be exposed thereto. Moreover, the control means provided by the present invention is explosion-proof, which is of importance in mills and other installations where explosive dust, gas or other media are present.

Employment of a proximity flag which is settable from a location remote from the weighing machine enables the weighing machine to be adjusted with facility for the weighing of different weights of material or materials, it being unnecessary for the attendant to adjust control elements mounted on the weighing machine, and when employed for weighing successively weights of different materials as in the making up of formulae, a single proximity flag settable from the remote location will control the different weighing operations and may be set in practically an unlimited number of positions.

The sequencing control provided by the present invention enables different materials to be weighed automatically, the settable proximity flag being advanced successively to the different positions to control the different weighing operations, and the tare check provided ensures a correct tare balanced condition of the weighing machine after completion of each cycle of weighing operations before commencement of the next weighing cycle.

We claim:
1. Weight controlled apparatus comprising weighing means, feeding means for supplying material thereto to be weighed, a controlling member movable in a direction to set it in different positions according to weights of material to be weighed, means remote from the weighing means for successively setting said controlling member in said direction into said positions, a weight responsive member movable in said direction of movement of said controlling member in accordance with weighing movements of the weighing means and in a path to bring said weight responsive member successively into controlling relationship with said controlling member, and means responsive successively to changes in the relationship between said controlling and weight controlled members by setting of the controlling member in different positions for sequentially controlling the operation of the feeding means.

2. Weight controlled apparatus as defined in claim 1, wherein said feeding means comprises separate feeding devices for respectively feeding materials to weighing means common to said feeding devices, and said means responsive to changes in the relationship between said controlling and weight controlled members controls the sequential operation of said feeding devices.

3. Weight controlled apparatus comprising weighing means, feeding devices for respectively supplying materials to the weighing means, a member having means remote from the weighing means for moving it in a direction to set it in different positions according to the weights of material to be supplied respectively by the feeding devices to the weighing means, a weight controlled member responsive to weighing movements of the weighing means and movable in said direction of movement of said settable member to cooperate successively with said settable member, means for operating the feeding devices, and means responsive to the relative positions of said settable and weight controlled members for sequentially controlling the operating means for the feeding devices.

4. Weight controlled apparatus comprising weighing means, feeding devices for respectively supplying materials to the weighing means, a controlling member, means remote from the weighing means for moving said controlling member in one direction to set it in one position according to a tare balance condition of the weighing means and for moving said controlling member in another direction to set it in different positions according to different weights of material to be supplied respectively by the feeding devices to the weighing means, a weight controlled member having means for moving it in said one or another direction of movement of the controlling member in response to movements of the weighing means into cooperative relation with the controlling member, and means responsive to the relative positions of said controlling and weight controlled members while the controlling member is in said one position for checking the tare balance condition of the weighing means and for controlling the feeding operations of said feeding devices while the controlling member is set in one or another of said different positions according to different weights of material to be supplied to the weighing means.

5. Weight controlled apparatus as defined in claim 4, wherein said controlling and weight controlled members are components of a capacitor which are relatively movable to and from juxtaposition, and said means for checking the tare balance condition of the weighing means and controlnig the operations of the feeding devices is responsive to variations in the extent of the area of juxtaposition of said controling and weight controlled members.

6. Weight controlled apparatus comprising weighing means, devices for respectively feeding materials to the weighing means, a controlling member settable in different positions corresponding to weights of material to be fed to the weighing means, a cooperative weight controlled member movable relatively to said controlling member in response to movements of the weighing means, means for setting said controlling member including settable devices located remote from the weighing means and means responsive to the setting of said remote devices for moving said controlling member successively in the direction of movement of said weight controlled member into different set positions corresponding to the settings of said remote devices, and means responsive successively to cooperative relationship of said controlling and weight controlled members for controlling the feeding means sequentially.

7. Weight controlled apparatus as defined in claim 6, wherein said means for controlling the feeding means sequentially comprises switches, and means for rendering said switches operative in succession under control of said remote setting devices and the relationship between said controlling and weight controlled members.

8. Weight controlled apparatus comprising weighing means, devices for feeding materials to the weighing means, cooperative control members one of which is movable in a direction to set it in different positions according to the weights of materials to be fed by the respective feeding devices and the other of which control member is movable in said direction of movement of the settable control member in response to weighing movements of the weighing means, means for setting the settable control member from a location remote from the weighing means including differential transmitting transformers settable for different weights of material and a differential receiving transformer responsive to the settings of the transmitting transformers, and means responsive to the relationship between said control members and the settings of the transmitting transformers for rendering the feeding devices operative sequentially.

9. Weight controlled apparatus as defined in claim 8, wherein said means for rendering the feeding devices operative sequentially comprises a set of switch contractors and means for rendering said contactors operative in succession to connect said transmitting transformers sequentially to said receiving transformer.

10. Weight controlled apparatus as defined in claim 9, wherein said means for rendering said feeding devices operative sequentially includes a servomotor responsive to the condition of said receiving transformer and connected to said settable control member, and means for rendering said motor operative to bring said receiving transformer into balance with the transmitting transformers and to set the settable control member in positions corresponding respectively with the settings of the transmitting transformers.

11. Weight controlled apparatus comprising weighing means, feeding devices for respectively feeding materials to the weighing means, a capacitor having one component settable in different positions corresponding to the weights of material to be fed by the respective feeding devices and another component movable in response to weighing movements of the weighing means, remote control means for setting the settable component of the capacitor in different positions relatively to said other component including a plurality of differential transmitting transformers settable respectively in different conditions and a differential receiving transformer, and a servomotor responsive to the condition of the receiving transformer for setting the settable component of the capacitor in positions corresponding respectively to the respective settings of the transmitting transformers, means including switches responsive to changes in the relationship between said components of the capacitor for rendering the feeding devices operative sequentially.

12. Weight controlled apparatus as defined in claim 11, wherein said transmitting transformers include a differential transformer settable to position said settable component of said capacitor to check the tare balance condition of the weighing means.

13. Weight controlled apparatus comprising weighing means, devices for feeding materials thereto, a capacitor having one component settable in different positions corresponding respectively to the weights of material to be fed by the respective feeding devices and another component movable relatively to the settable component in response to movements of the weighing means, remote control means for setting the movable component of the capacitor in different positions relatively to said other component thereof comprising a plurality of differential transmitting transformers and a differential receiving transformer, and a servomotor responsive to the condition of the receiving transformer for bringing the receiving transformer into balance with the respective transmitting transformer and to set the settable component of the capacitor into positions corresponding to the settings of the respective transmitting transformers, means responsive to changes in the relative positions of the components of the capacitor for rendering the feeding devices operative sequentially, and means responsive to proximity of said components of the capacitor for stopping the feeding devices.

14. Weight controlled apparatus as defined in claim 13, including means responsive to proximity of the components of said capacitor for discharging the weighing means.

15. Weight controlled apparatus comprising a dial scale, means for feeding thereto material to be weighed, a pair of flags mounted for movement in adjacent paths around the scale dial and constituting components of a capacitor, electric motor means connected to one of the flags to set it in one or another position around the scale dial, weight selecting means remote from the scale dial and including an electrical selector and transmission means for electrically connecting it to the electric motor means for rendering the motor means operative to set the flag connected thereto around the scale dial in a position according to the weight of material to be weighed, means for advancing the other flag around the scale dial into juxtaposed relation with the flag set by the motor means in response to weighing movements of the scale, and means responsive to a predetermined area of juxtaposition of the flags for controlling the operation of the feeding means.

16. Weight controlled apparatus comprising a dial scale, means for feeding thereto material to be weighed, a pair of flags mounted for movement in adjacent paths around the scale dial and constituting components of a capacitor, electric motor means connected to one of the flags for movement thereby around the scale dial, control means remote from the scale dial including electrical selectors and transmission means for electrically connecting them to said electric motor means to respectively render the motor means operative to set the flag connected thereto in different positions around the scale dial according to different weights of material to be weighed, means responsive to weighing movements of the scale and connected to the other flag for moving said other flag around the scale dial successively into juxtaposed relation with the flag connected to the motor means while the latter flag is set in each of said different positions, and means responsive to a predetermined area of juxtaposition of the flags while the flag connected to the motor means is set in each of said different positions for sequentially controlling the operation of the feeding means.

17. Weight controlled apparatus comprising weighing means including a receiver for material to be weighed, means for feeding weights of material to said receiver to perform successive weighing cycles, a control member movable in a given direction into different positions corresponding to the weights of material to be weighed, means remote from the weighing means for setting said control member in said positions, a member having means for advancing it in said direction of movement of said control member and in a path to cooperate therewith in response to the weights of material fed to said receiver and to weighing movements of the weighing means during each weighing cycle, and means responsive to cooperative relationship assumed by said weight responsive member relatively to said control member during each cycle as predetermined by the setting of control member in said positions for interrupting the feeding of the weights of material to said receiver.

18. Weight controlled apparatus comprising weighing means including a weigh hopper to receive and weigh materials, means for feeding weights of materials consecutively to said weigh hopper for accumulation therein during a weighing cycle, a control member movable in a direction to set it in different positions corresponding respectively to the weights of materials to be fed to said weigh hopper, means remote from the weighing means for setting said control member sequentially in said positions during each cycle, a weight responsive member having means responsive to the weights of materials fed consecutively to and accumulating in said weigh hopper for advancing said weight responsive member during each cycle in said direction of movement of said control member and in a path to cooperate therewith in its different set positions, and means operative in response to the cooperative relationships successively assumed by said weight responsive member with said control member in its set positions during each cycle for sequentially interrupting the feeding of one of the materials to said weigh hopper and initiating the feeding of another of said materials thereto.

References Cited in the file of this patent

UNITED STATES PATENTS

| | | |
|---|---|---|
| Re. 20,141 | Bliss | Oct. 13, 1931 |
| (Original No. 1,826,919) | | |
| 2,097,551 | Garlinghouse | Nov. 2, 1937 |
| 2,193,594 | Johnson | Mar. 12, 1940 |
| 2,199,010 | Robb | Apr. 30, 1940 |
| 2,323,023 | Flanagan | June 29, 1943 |
| 2,336,130 | Saxe | Dec. 7, 1943 |
| 2,527,147 | Noble | Oct. 24, 1950 |
| 2,549,704 | Noble | Apr. 17, 1951 |
| 2,607,555 | Noble | Aug. 19, 1952 |
| 2,607,579 | Noble | Aug. 19, 1952 |
| 2,610,052 | Macgeorge | Sept. 9, 1952 |

FOREIGN PATENTS

| | | |
|---|---|---|
| 713,044 | Germany | Oct. 30, 1941 |
| 726,355 | Germany | Oct. 12, 1942 |